United States Patent
Henne et al.

(10) Patent No.: US 9,695,936 B2
(45) Date of Patent: Jul. 4, 2017

(54) MULTILAYER METAL GASKET WITH BEAD ON STOPPER

(75) Inventors: Joseph Henne, Birmingham, MI (US); Steven Honkala, Wolverine Lake, MI (US)

(73) Assignee: Federal-Mogul LLC, Southfield, MI (US)

( * ) Notice: Subject to any disclaimer, the term of this patent is extended or adjusted under 35 U.S.C. 154(b) by 312 days.

(21) Appl. No.: 13/086,481

(22) Filed: Apr. 14, 2011

(65) Prior Publication Data

US 2012/0261889 A1   Oct. 18, 2012

(51) Int. Cl.
*F02F 11/00*     (2006.01)
*F16J 15/08*     (2006.01)

(52) U.S. Cl.
CPC ...... *F16J 15/0825* (2013.01); *F16J 2015/085* (2013.01); *F16J 2015/0862* (2013.01); *F16J 2015/0875* (2013.01)

(58) Field of Classification Search
USPC .......................... 277/593, 594, 591, 595, 598
See application file for complete search history.

(56) References Cited

U.S. PATENT DOCUMENTS

| | | | |
|---|---|---|---|
| 4,451,051 A * | 5/1984 | Nicholson ...................... | 277/595 |
| 5,209,504 A * | 5/1993 | Udagawa et al. ............ | 277/595 |
| 5,628,113 A | 5/1997 | Tanaka et al. | |
| 5,639,101 A * | 6/1997 | Tanaka et al. ................ | 277/593 |
| 5,713,580 A * | 2/1998 | Ueta .............................. | 277/593 |
| 5,803,462 A * | 9/1998 | Kozerski ........................ | 277/595 |
| 6,148,516 A * | 11/2000 | Diez et al. .................... | 29/888.3 |

(Continued)

FOREIGN PATENT DOCUMENTS

| | | |
|---|---|---|
| DE | 102004061964 A1 | 7/2006 |
| EP | 1666775 A1 | 6/2006 |

(Continued)

OTHER PUBLICATIONS

International Search Report mailed on Jul. 16, 2012.

*Primary Examiner* — Kristina Fulton
*Assistant Examiner* — Eugene G Byrd
(74) *Attorney, Agent, or Firm* — Robert L. Stearns; Dickinson Wright, PLLC

(57) ABSTRACT

A multilayer metal gasket (28) for establishing a seal between two mating members, such as between a cylinder head (22) and an engine block (24). The gasket assembly (28) includes a primary functional layer (30) having an embossed primary sealing bead (38). A primary stopper layer (52) bridges the convex embossed portion of the primary sealing bead and is fixed relative to the primary functional layer (30) by welding (54) or clinching. A secondary functional layer (44) is paired with the primary functional layer (30) and inverted relative thereto so that its secondary sealing bead (48) aligns with the primary sealing bead (38) and their respective concave depressions open toward one another, with the primary stopper layer (52) sandwiched therebetween. A compression limiter (50) may be carried on the functional layer (44) or alternatively a distance layer (364, 464). The assembly (28) may include a tertiary functional layer (58) having a tertiary sealing bead (62) inverted relative to, and aligned directly with, the primary sealing bead (38).

14 Claims, 4 Drawing Sheets

(56) References Cited

U.S. PATENT DOCUMENTS

| | | | |
|---|---|---|---|
| 6,315,303 B1* | 11/2001 | Erb et al. | 277/593 |
| 6,619,666 B1 | 9/2003 | Tanaka et al. | |
| 6,702,297 B2 | 3/2004 | Furuta et al. | |
| 6,722,662 B2* | 4/2004 | Heilig et al. | 277/600 |
| 6,746,021 B2* | 6/2004 | Breen | 277/594 |
| 6,796,562 B2* | 9/2004 | Stapel | 277/594 |
| 6,923,450 B2* | 8/2005 | Unseld et al. | 277/592 |
| 7,377,520 B2* | 5/2008 | Imai | 277/594 |
| 7,407,164 B2* | 8/2008 | Diez et al. | 277/592 |
| 7,815,197 B2* | 10/2010 | Ueta | 277/593 |
| 8,100,409 B2* | 1/2012 | Schmitz | 277/593 |
| 8,128,098 B2* | 3/2012 | Plunkett | 277/593 |
| 8,162,326 B2* | 4/2012 | Hohe et al. | 277/593 |
| 2005/0140096 A1* | 6/2005 | Golombek et al. | 277/594 |
| 2005/0189724 A1 | 9/2005 | Schmitz | |
| 2009/0072493 A1* | 3/2009 | Duckek et al. | 277/593 |
| 2009/0200752 A1 | 8/2009 | Okano | |
| 2011/0192369 A1* | 8/2011 | Schmitz | 123/193.1 |
| 2012/0193877 A1* | 8/2012 | Okano et al. | 277/593 |

FOREIGN PATENT DOCUMENTS

| | | |
|---|---|---|
| JP | S6477740 A | 3/1989 |
| JP | H08114267 A | 5/1996 |
| JP | 2007247631 A | 9/2007 |
| JP | 2007525629 A | 9/2007 |
| WO | 0229293 A1 | 4/2002 |

* cited by examiner

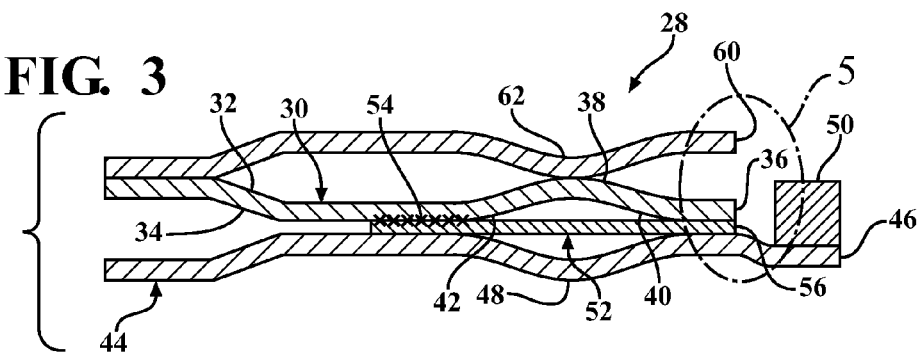
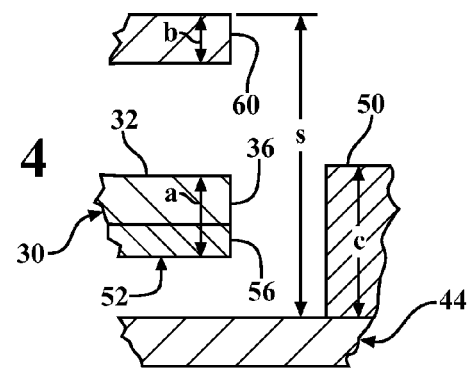
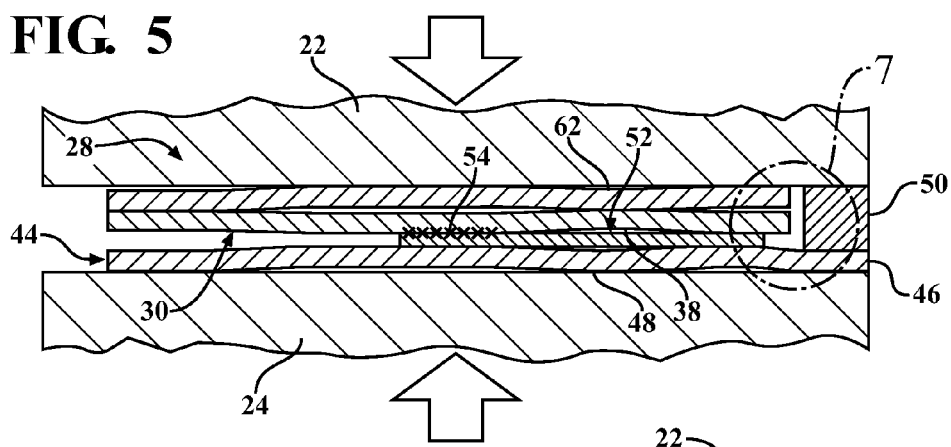
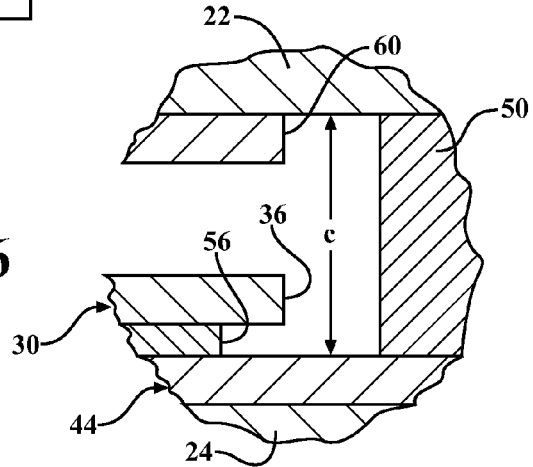

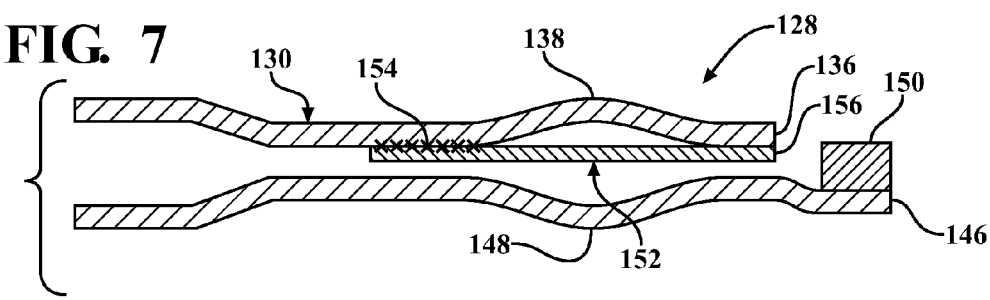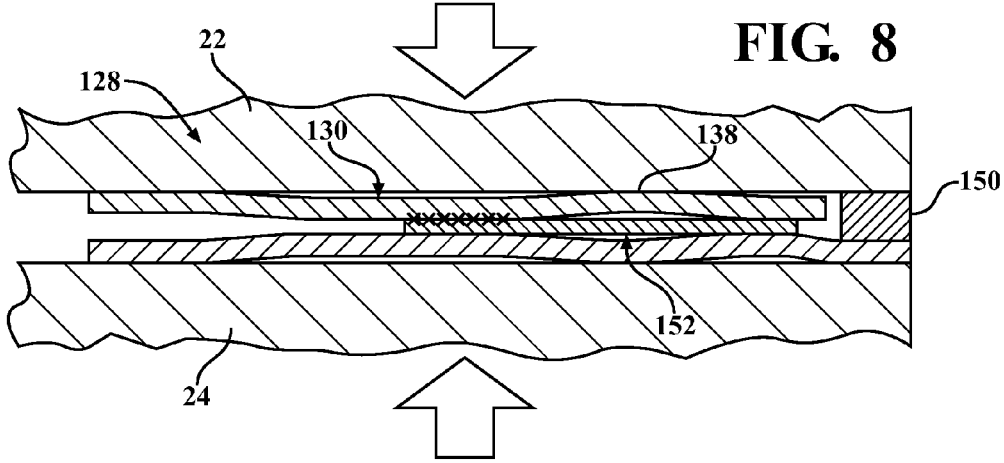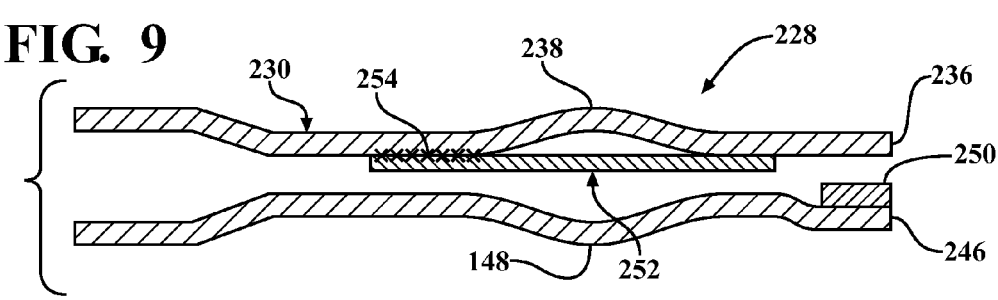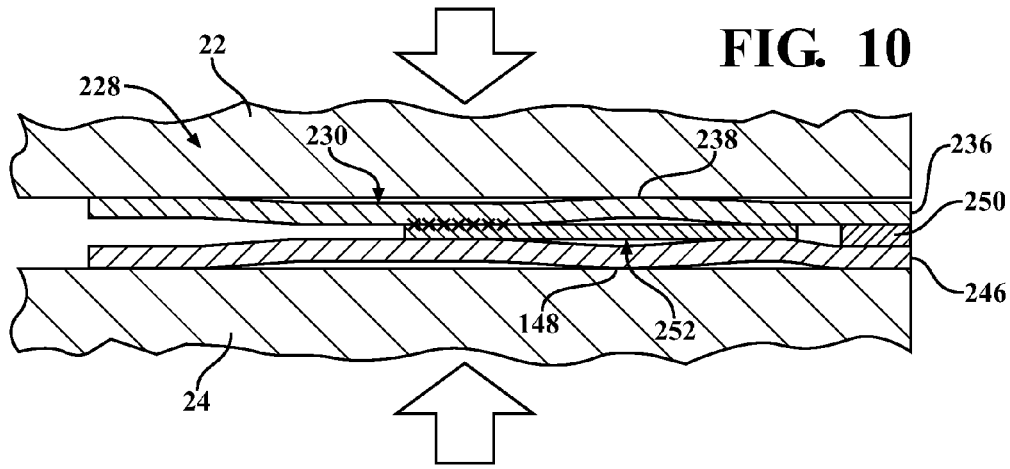

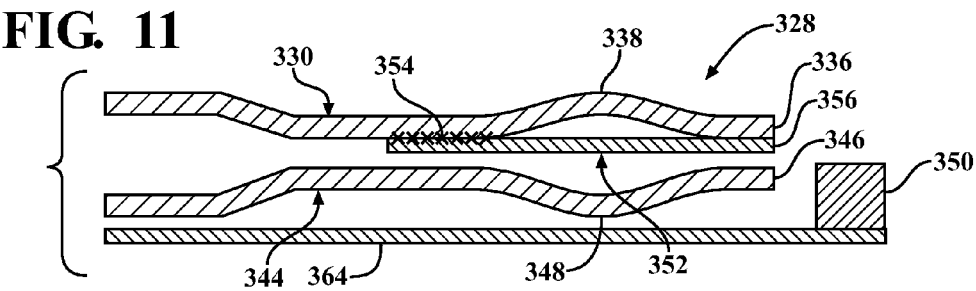
FIG. 11
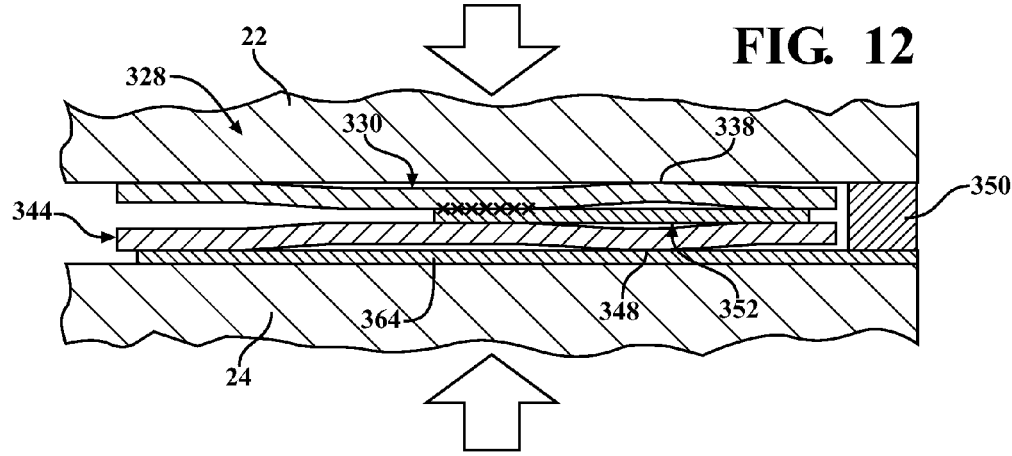
FIG. 12
FIG. 13
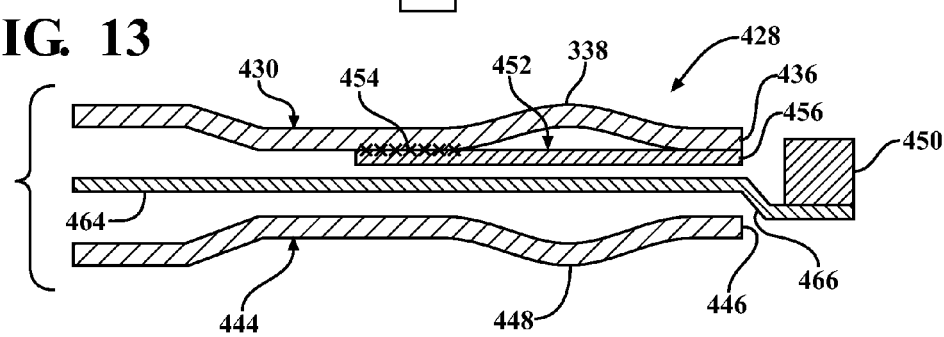
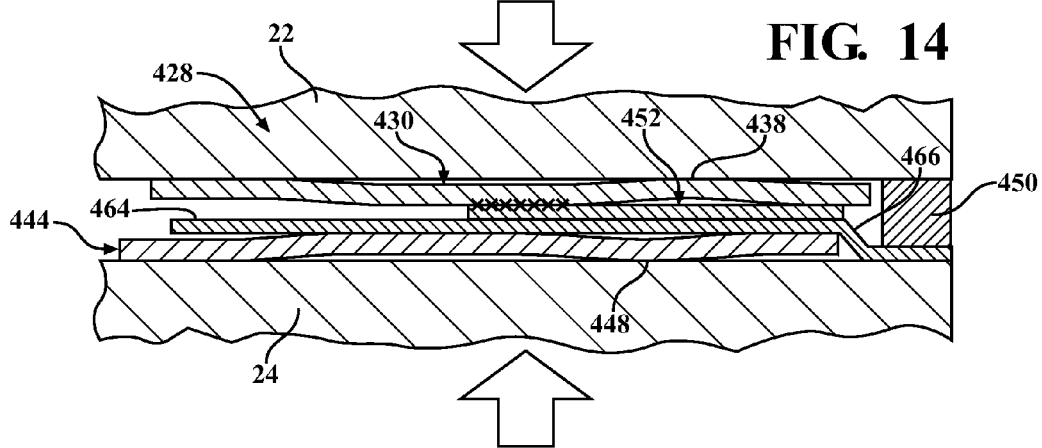
FIG. 14

MULTILAYER METAL GASKET WITH BEAD ON STOPPER

BACKGROUND OF THE INVENTION

Field of the Invention

This invention relates generally to static gaskets of the type used to establish a fluid-tight seal between two members to be clamped together, and more particularly to multilayer static gaskets clamped between a cylinder head and an engine block in an internal combustion engine.

Related Art

When establishing a fluid-tight seal between two members to be clamped together, such as between a cylinder head and an engine block, it is common in certain high-temperature applications to use a static gasket having multiple layers. Generally, at least one of the layers of the multilayer gasket, sometimes referred to as a functional layer, has an embossed sealing bead that is flattened when compressed between the two opposing members. This compressible sealing bead helps to establish a fluid-tight seal. The gasket may include more than one functional layer and/or one or more so-called distance layers. Distance layers are configured to abut one (or more) of the functional layers in an effort to establish a combustion seal by compressing the sealing bead of the functional layer. Unfortunately, while fastening the cylinder head to an engine block, or other applications, damage can occur to the sealing bead in the event of overcompression. If the seal bead is overcompressed and substantially flattened, in addition to losing its ability to exert a high compression sealing pressure, fatigue cracks can form in the area of the sealing bead both during initial clamping and later while in use. Fatigue cracks are particularly undesirable as they ultimately reduce the ability of a static gasket to establish a tight seal, thereby diminishing its life and performance characteristics. To address the overcompression issue, the prior art has taught the use of a compression limiter, or stopper, feature. The compression limiter is most often configured as a solid, substantially incompressible, metallic ring whose height establishes to maximum compressibility of the entire gasket assembly.

US Publication No. 2009/0200752 to Okano, published Oct. 13, 2009 and assigned to the assignee of this invention, describes a multilayer static gasket including a supplemental bead compression limiting feature. The entire disclosure of US Publication No. 2009/0200752 is hereby incorporated by reference and relied upon. While effective, the gasket construction described in this prior document can, in some circumstances, be difficult to manufacture as it may require precision manufacturing processes to achieve subtle differences in stopper heights.

Accordingly, there is a need in the art for an improved multilayer static gasket construction including a bead compression limiting feature and further which is easily manufactured using conventional techniques and relatively low cost materials.

SUMMARY OF THE INVENTION

The subject invention comprises a multilayer metal gasket for establishing a seal between two opposing members. The gasket comprises a primary functional layer having a generally uniform thickness and oppositely facing first and second sides. The primary functional layer includes at least one interior opening. The primary functional layer includes a resilient primary sealing bead surrounding the opening. The primary sealing bead comprises an integral undulation in the primary functional layer forming a convex distortion in the first side and a complementary concave depression in the second side. A secondary functional layer is disposed side-by-side with the primary functional layer. The secondary functional layer includes at least one interior opening generally aligned with the interior opening in the primary functional layer. The secondary functional layer includes a resilient sealing bead surrounding the opening. The secondary sealing bead comprises an integral undulation forming a convex distortion in the secondary functional layer and a complimentary concave depression. The secondary sealing bead is generally aligned with the primary sealing bead and inverted relative thereto so that the concave depression of the secondary sealing bead opens toward the concave depression of the primary sealing bead and vice versa. A compression limiter prevents the primary and secondary sealing beads from being completely flattened when the gasket assembly is compressed between the two opposing members. A primary stopper layer is operatively associated with the primary functional layer and is disposed along the second side thereof. The primary stopper layer directly underlies the primary sealing bead and bridges its concave depression.

According to this invention, the primary stopper layer forms a compression limiting feature and functions in cooperation with the primary functional layer. The subject gasket can be manufactured using conventional, relatively inexpensive techniques. When a multilayer metal gasket is constructed in accordance with this invention, the primary stopper layer functions to limit full or overcompression of the primary and secondary sealing beads and thereby prevent premature fatigue cracks and other undesirable effects. The primary stopper layer balances loading between the primary and secondary sealing beads and thereby enhances the sealing characteristics of the gasket assembly.

BRIEF DESCRIPTION OF THE DRAWINGS

These and other features and advantages of the present invention will become more readily appreciated when considered in connection with the following detailed description and appended drawings, wherein:

FIG. 3 is a fragmentary, cross-sectional view of a gasket assembly according to the subject invention;

FIG. 4 is an enlarged view of the area circumscribed at 4 in FIG. 3 identifying relative component heights of the gasket assembly;

FIG. 5 is a cross-sectional view of the gasket shown in FIG. 3 and clamped between two opposing members which may, for example, comprise a cylinder head and an engine block;

FIG. 6 is an enlarged view of the area circumscribed at 6 in FIG. 5;

FIG. 7 is a fragmentary, cross-sectional view of a gasket assembly according to a first alternative embodiment of the subject invention;

FIG. 8 is a view of the gasket assembly of FIG. 7 shown clamped between two opposing members;

FIG. 9 is a fragmentary, cross-sectional view of a gasket assembly according to a second alternative embodiment of this invention;

FIG. 10 is a view of the gasket assembly of FIG. 9 shown clamped between two opposing members;

FIG. 11 is a fragmentary, cross-sectional view of a third alternative embodiment of this invention;

FIG. 12 is a cross-sectional view of the gasket assembly as shown in FIG. 11 and clamped between two opposing members;

FIG. 13 is a fragmentary, cross-sectional view of a gasket assembly according to a fourth alternative embodiment of this invention; and FIG. 14 is a view of the gasket assembly as shown in FIG. 13 and clamped between two opposing members.

DETAILED DESCRIPTION OF THE PREFERRED EMBODIMENT

Figure 2:
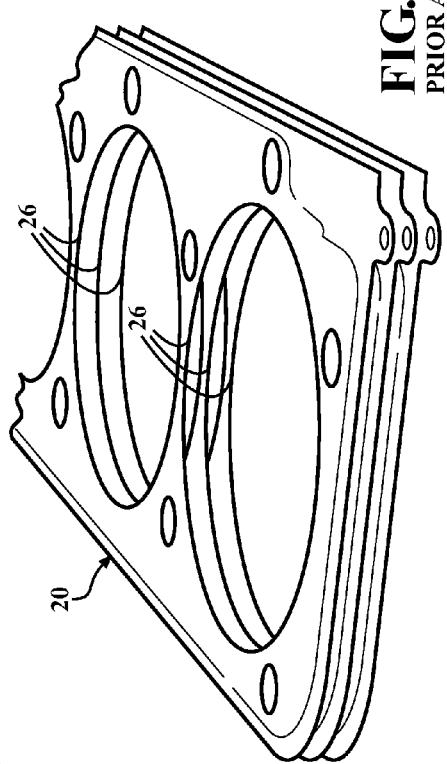
FIG. 2 is an enlarged, fragmentary view of a multilayer cylinder head gasket according to the prior art.
Figure 1:
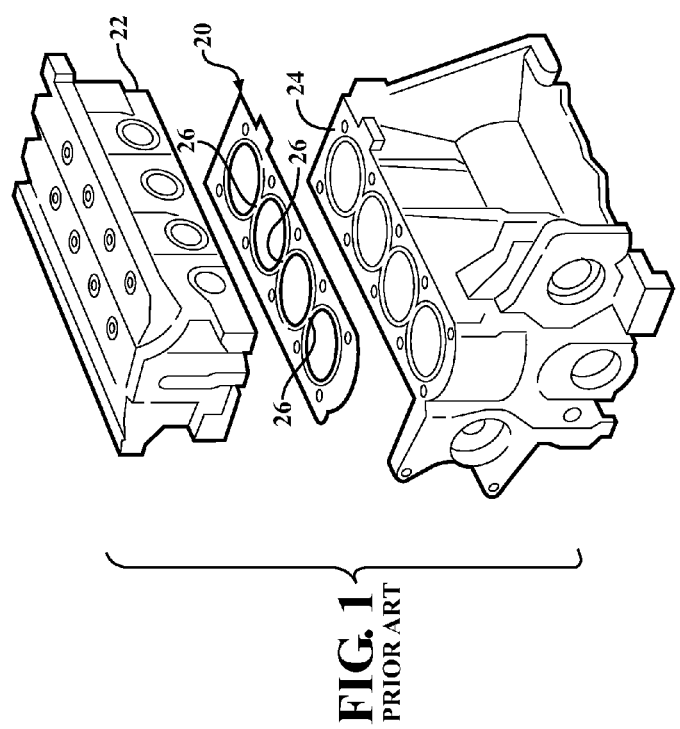
FIG. 1 is a simplified, exploded view of a prior art engine assembly including a multilayer gasket disposed between an engine block and a cylinder head.

Referring to the figures, wherein like numerals indicate like or corresponding parts throughout the several views, a typical prior art style multilayer metal gasket, also referred to as a multilayer steel (MLS) gasket is generally indicated at 20 in FIG. 1. The gasket 20 is shown here clamped between a cylinder head 22 and an engine block 24 to perfect a combustion seal around multiple combustion chambers (i.e., cylinder bores) as well as around lubrication and cooling passages shared by the two mating members 22, 24. However, multilayer metal gaskets 20 can also be used in other applications, such as to seal an exhaust manifold to an engine block, as well as other engine and non-engine applications. An enlarged view of the prior art multilayer gasket 20 is shown in FIG. 2. Frequently, cylinder head gaskets 20 like that shown in FIGS. 1 and 2 include multiple bore openings 26 corresponding with the combustion chambers of the engine.

A multilayer metal gasket according to the subject invention is generally shown at 28 in FIGS. 3-6. The gasket assembly 28 is particularly well-suited for establishing a seal between a cylinder head 22 and an engine block 24 in an internal combustion engine, but may be applied with effectiveness to other sealing applications. The gasket 28 includes a primary functional layer, generally indicated at 30. The primary functional layer 30 has a generally uniform thickness and can be made in a stamping operation. The primary functional layer 30 includes oppositely facing first 32 and second 34 sides. In the example depicted in FIGS. 3 and 5, the first side 32 is an upper surface of the gasket 28 and the second side 34 comprises the undersurface or bottom surface. As will be seen in other embodiments of this invention, however, the sides 32, 34 may be inverted depending upon the application. The primary functional layer 30 includes at least one interior opening 36 which, in the exemplary case of a cylinder head gasket, might correspond to a cylinder bore in the engine block 24. A resilient primary sealing bead 38 surrounds the opening 26. The primary sealing bead 38 is formed as an embossment in the primary functional layer 30. The primary sealing bead 38 takes the shape of an integral undulation having a convex distortion on the first side 32 and a complementary concave depression in the second side 34. As perhaps best shown in FIG. 3, the concave depression interrupts the second side 34 of the primary functional layer 30 at radially spaced-apart inner 40 and outer 42 interfaces.

A secondary functional layer, generally indicated at 44, is disposed side-by-side with the primary functional layer 30. The secondary functional layer 44 includes at least one interior opening 46 generally aligned with the interior opening 36 in the primary functional layer 30. As shown in FIGS. 3 and 5, the inner diameter of the secondary opening 46 is smaller than that of the primary opening 36, however both are centered relative to the cylinder bore in the engine block 24. The secondary functional layer 44 also includes a secondary sealing bead 48 that surrounds the opening 46. The secondary sealing bead 48 comprises an integral undulation in the secondary functional layer 44 much like that of the primary functional layer 30. As a result, the secondary sealing bead 48 takes the shape of an embossment having a convex distortion on one side and a complementary concave depression on the other side of the secondary functional layer 44. The secondary sealing bead 48 is generally aligned with the primary sealing bead 38 and inverted relative thereto so that one overlies the other. These features are arranged so that the concave depression of the secondary sealing bead 48 opens toward, or into, the concave depression in the primary sealing bead 38, and vice versa. As shown in FIG. 3, these two beads 38, 48 form something of an annular void or hollowed space as their respective convex portions point in opposite directions.

A compression limiter 50 is provided for the purpose of preventing overcompression of the primary 38 and secondary 48 sealing beads. In other words, the compression limiter 50 serves to prevent the complete flattening of the primary 38 and secondary 48 sealing beads when the gasket assembly 28 is compressed between two opposing members.

A primary stopper layer, generally indicated at 52, is operatively associated with the primary functional layer 30 and is disposed along the second side 34 thereof. The primary stopper layer 52 directly underlies the primary sealing bead 38 and bridges its concave depression, as shown in FIG. 3. The primary stopper layer 52 is, in this preferred embodiment, directly affixed to the second side 34 of the primary functional layer 30 by welding 54. Other fixation techniques may include mechanical clinching or other suitable methods. The weld line 54 is placed adjacent to the outer interface 42 so that the portion of the primary stopper layer adjacent the inner interface 40 remains slidably disposed relative to the primary functional layer 30. In this way, the primary sealing bead 38 is not locked by the primary stopper layer 52, but rather is free to compress when clamped between two mating members as shown in FIG. 5. In particular, as shown in FIG. 6, the opening 36 in the primary functional layer 30 will be displaced radially inwardly relative to an inward edge 56 of the primary stopper layer 52 as the embossment 38 flattens out. This can be easily seen by a comparison of FIGS. 4 and 5.

If the primary stopper layer 52 were instead fixed to the radially inward side of the embossed sealing bead 38, then one would expect the edges 36, 56 to remain relatively flush after compression. In the embodiment depicted in FIGS. 3-6, the primary stopper layer 52 is disposed directly between the concave depression of the secondary sealing bead 48 and the concave depression of the primary sealing bead 38. In other words, there are no additional intervening layers and the primary stopper layer 52 directly contacts the second sides of both functional layers 30, 44. Preferably, the primary stopper layer 52 is a sheet-like member having a generally uniform thickness. In the application of cylinder head gaskets, the primary stopper layer 52 will have a generally planar, annular shape centered around the combustion bore openings 36, 46.

The gasket assembly 28 may include a tertiary functional layer 58 disposed side-by-side with the primary functional layer 30. The tertiary functional layer 58 includes at least one interior opening 60 generally aligned with the opening 36 in the primary functional layer 30. The tertiary functional layer 58 has a resilient tertiary sealing bead 62 embossed, like the others, as an integral undulation surrounding the opening 60. The tertiary sealing bead 62 likewise includes a convex distortion and a complimentary concave depression in the opposing sides of the tertiary functional layer 58. In this embodiment, the tertiary sealing bead 62 is generally aligned with (i.e., stacked over) the primary sealing bead 38 and inverted relative thereto so that their respective convex distortions touch one another in direct contact. Therefore, as will be seen, the alternating sealing beads 38, 48, 62 form a spring stack thereby enabling the gasket assembly 28 to maintain compression when clamped between two opposing surfaces as shown in FIG. 5.

Referring now to FIGS. 4 and 6, relative dimensional thicknesses are shown including a combined natural stack height S representing the unstressed height of the primary functional layer 30, primary stopper layer 52, and tertiary functional layer 58. The compression limiter 50 in this example is shown having a height measure c. It should be noted that, in this embodiment, the compression limiter 50 is fixedly disposed on the functional layer 44. Here, the combined natural stack height S is greater than the height c of the compression limiter 50. However, when the gasket assembly 28 is clamped between two opposing members 22, 24, the primary 30 and tertiary 58 functional layers are compressed to the height measure c of the compression limiter 50. It should be noted that the thickness a of the combined primary stopper layer 52 and primary functional layer 30, combined with the thickness b of the tertiary functional layer 58 is less than the height c of the compression limiter 50. This can be seen in FIG. 6 wherein the fully compressed gasket assembly 28, at the compression limiter height c, does not result in the full compression of the sealing beads 38, 48, 62 as evidenced by an air gap between the primary 30 and tertiary 58 functional layers. Therefore, a mathematical formula may be expressed: $a+b<c<S$.

FIGS. 7 and 8 represent a first alternative embodiment of the invention wherein the tertiary functional layer is omitted. In this example, like or corresponding parts to those described above in connection with FIGS. 3-6 are identified with similar reference numerals offset by 100. Thus, a primary functional layer 130 includes an integrated primary stopper layer 152 attached by a weld 154. An opposing secondary functional layer 144 carries a compression limiter 150. The assembly 128 can be compressed between two mating members as shown in FIG. 8 with similar effectiveness and advantages to those described above in connection with the preferred embodiment.

FIGS. 9-10 show a second alternative embodiment of the subject invention, wherein like or corresponding parts are identified with similar reference numbers offset by 200. A distinction between this second alternative embodiment and the first alternative embodiment (FIGS. 7-8) is that the primary functional layer 230 is extended at its opening 236 to overlie the compression limiter 250 with a corresponding reduction in the height of the compression limiter 250. This example illustrates another alternative manner in which the general principles of the subject invention can be expressed within the context of a multilayer gasket assembly.

FIGS. 11 and 12 describe a third alternative embodiment of the subject invention wherein like or corresponding parts are identified with similar reference numbers offset by 300. A distinction of this third alternative embodiment is the inclusion of a distance layer 364. The distance layer 364 may comprise a generally flat, sheet-like metallic member disposed, in this example, on the opposite side of the secondary functional layer 344. In this example, the compression limiter 350 is directly affixed to the distance layer 364. The convex portion of the secondary sealing bead 348 directly contacts the distance layer 364 when the assembly 328 is compressed between two mating members 22, 24 as shown in FIG. 12.

A fourth alternative embodiment of the subject gasket assembly is generally shown at 428 in FIGS. 13 and 14, wherein previously established reference numbers are offset by 400 for convenience. This fourth alternative embodiment is similar to the third alternative embodiment of FIGS. 11 and 12, in that a distance layer 464 is included and carries the compression limiter 450. A distinction in this fourth alternative embodiment, however, is the placing of the distance layer 464 between the primary 430 and secondary 444 functional layers. As shown, it may be advantageous to form a crank or offset 466 in the distance layer 464 to facilitate smooth compression of the various layers when disposed between two mating members, as shown in FIG. 14.

The gasket assembly according to this invention, as exemplified throughout the various embodiments, is advantageous in limiting the load placed upon the sealing beads, particularly in high load applications. This is accomplished through the incorporation of a compression limiter in combination with a primary stopper layer, and by structuring these components so that the compression limiter is taller than the other components when fully compressed. A gasket assembly according to this invention therefore balances the load advantageously between at least two different sealing bead elements. Load limits on the sealing embossments can be accomplished without relying upon precision manufacturing processes.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. A multilayer metal gasket for establishing a seal between a two opposing members, said gasket comprising:
    a primary functional layer having a generally uniform thickness and oppositely facing first and second sides; said primary functional layer including at least one interior opening; said primary functional layer including a resilient primary sealing bead surrounding said at least one interior opening, said primary sealing bead comprising an integral undulation in said primary functional layer forming a convex distortion in said first side and a complimentary concave depression in said second side;
    a secondary functional layer disposed in side-by-side, overlying relation with said primary functional layer; said secondary functional layer having oppositely facing first and second sides including at least one interior opening generally coaxially aligned with said at least one interior opening of said primary functional layer, said at least one interior opening of said secondary functional layer having a smaller diameter than said at least one interior opening of said primary functional layer; said secondary functional layer including a resilient secondary sealing bead surrounding said at least one interior opening of said secondary functional layer, said secondary sealing bead comprising an integral undulation in said secondary functional layer forming a convex distortion in said first side of said secondary functional layer and a complimentary concave depression in said second side of said secondary functional layer; said secondary sealing bead is generally aligned with said primary sealing bead and inverted relative thereto so that said concave depression of said secondary sealing bead opens toward said concave depression of said primary sealing bead and vice versa;

a compression limiter for preventing said primary and secondary sealing beads from being completely flattened when said gasket assembly is compressed between the two opposing members;

a primary stopper layer operatively associated with said primary functional layer and disposed along said second side thereof; said primary stopper layer directly underlying said primary sealing bead and bridging said concave depression thereof; and wherein said compression limiter is a separate piece of material fixedly disposed on said second side of said secondary functional layer between said secondary sealing bead and said interior opening of said secondary functional layer with said interior opening of said secondary functional layer remaining exposed and said compression limiter being disposed and spaced radially inwardly of said primary stopper layer and at least one interior opening in said primary functional layer.

2. The multilayer metal gasket of claim 1, wherein said concave depression adjoins said second side of said primary functional layer at radially spaced apart inner and outer interfaces; and wherein said primary stopper layer is directly affixed to said second side of said primary functional layer adjacent said outer interface while remaining slideably disposed relative to said inner interface.

3. The multilayer metal gasket of claim 1, wherein said primary stopper layer is disposed directly between said concave depression of said secondary sealing bead and said concave depression of said primary compression bead.

4. The multilayer metal gasket of claim 1, wherein said primary stopper layer has a generally uniform thickness.

5. The multilayer metal gasket of claim 4, wherein said primary stopper layer is generally planar.

6. The multilayer metal gasket of claim 4, wherein said primary stopper layer is generally annular.

7. The multilayer metal gasket of claim 1, further including a tertiary functional layer disposed side-by-side with said primary functional layer; said tertiary functional layer including at least one interior opening generally aligned with said interior opening in said primary functional layer; said tertiary functional layer including a resilient tertiary sealing bead surrounding said at least one interior opening of said tertiary functional layer, said tertiary sealing bead comprising an integral undulation in said tertiary functional layer forming a convex distortion and a complimentary concave depression.

8. The multilayer metal gasket of claim 7, wherein said tertiary sealing bead is generally aligned with said primary sealing bead and inverted relative thereto so that said convex distortion of said tertiary sealing bead extends toward said convex distortion of said primary sealing bead and vice versa.

9. The multilayer metal gasket of claim 8, wherein said convex distortion of said tertiary sealing bead is in direct contact with said convex distortion of said primary compression bead.

10. The multilayer metal gasket of claim 1, wherein said primary functional layer and said secondary functional layer have a combined natural stack height (S) representing an unstressed height prior to clamping between the opposing members; and wherein said compression limiter has a height measure (c); said combined natural stack height (S) being greater than said height (c) of said compression limiter.

11. A multilayer metal gasket for establishing a seal between a two opposing members, said gasket comprising:

a primary functional layer having a generally uniform thickness and oppositely facing first and second sides; said primary functional layer including at least one interior opening; said primary functional layer including a resilient primary sealing bead surrounding said at least one interior opening, said primary sealing bead comprising an integral undulation in said primary functional layer forming a convex distortion in said first side and a complimentary concave depression in said second side;

a secondary functional layer disposed side-by-side, overlying relation with said primary functional layer; said secondary functional layer including at least one interior opening generally coaxially aligned with said interior opening in said primary functional layer; said secondary functional layer including a resilient secondary sealing bead surrounding said at least one interior opening of said secondary functional layer, said secondary sealing bead comprising an integral undulation in said secondary functional layer forming a convex distortion and a complimentary concave depression; said secondary sealing bead generally aligned with said primary sealing bead and inverted relative thereto so that said concave depression of said secondary sealing bead opens toward said concave depression of said primary sealing bead and vice versa;

a compression limiter for preventing said primary and secondary sealing beads from being completely flattened when said gasket assembly is compressed between the two opposing members;

a primary stopper layer operatively associated with said primary functional layer and disposed along said second side thereof; said primary stopper layer directly underlying said primary sealing bead and bridging said concave depression thereof;

a distance layer having oppositely facing sides defining a thickness of said distance layer and at least one interior opening extending through said opposite sides of said distance layer, said at least one interior opening of said distance layer having a smaller diameter than said at least one interior openings of said primary and secondary functional layers; and wherein said compression limiter is a separate piece of material fixedly disposed on one of said sides of said distance layer with said interior opening of said distance layer being exposed, said compression limiter being fixed to said distance layer radially inwardly from said primary and secondary sealing beads and radially inwardly of said at least one interior opening of said primary and said secondary functional layers.

12. The multilayer metal gasket of claim 11, wherein said distance layer is sandwiched between said primary and secondary functional layers.

13. The multilayer metal gasket of claim 1, wherein said compression limiter is substantially flush with said at least one interior opening of said secondary functional layer to establish an inner-most boundary of said at least one interior opening of said secondary functional layer.

14. The multilayer metal gasket of claim 1, wherein said compression limiter is adjacent said at least one interior opening of said secondary functional layer.

* * * * *